D. A. COOK.
COUPLING.
APPLICATION FILED JAN. 9, 1914.
1,125,067.
Patented Jan. 19, 1915.
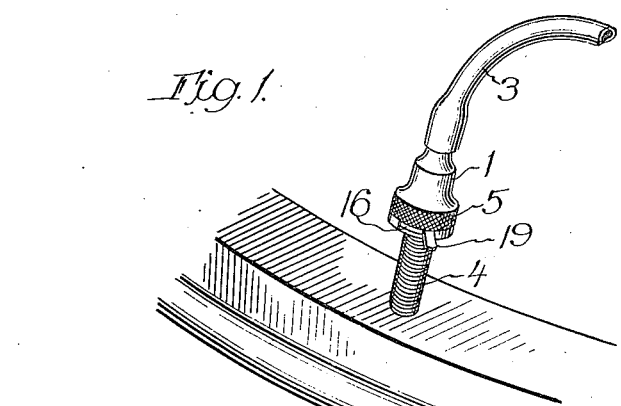
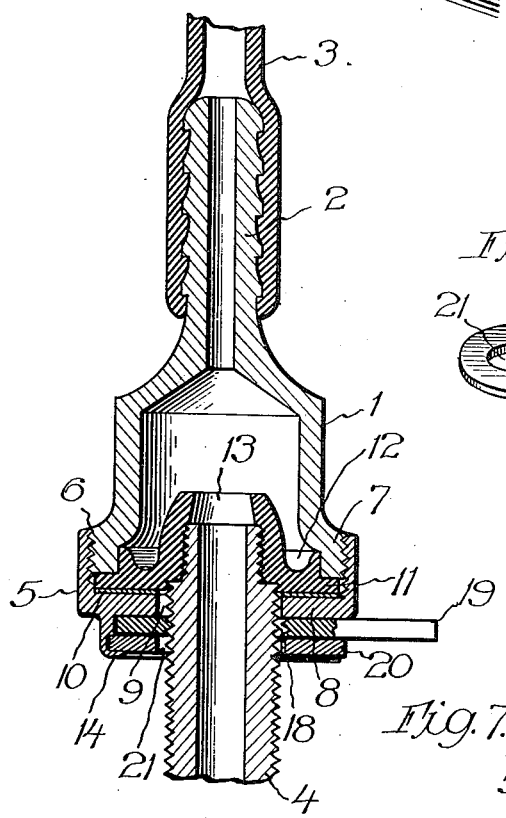
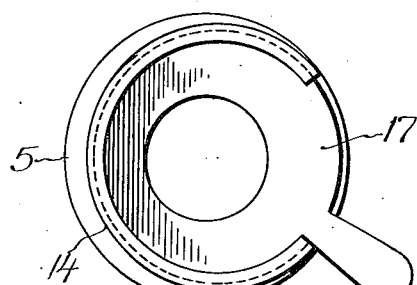
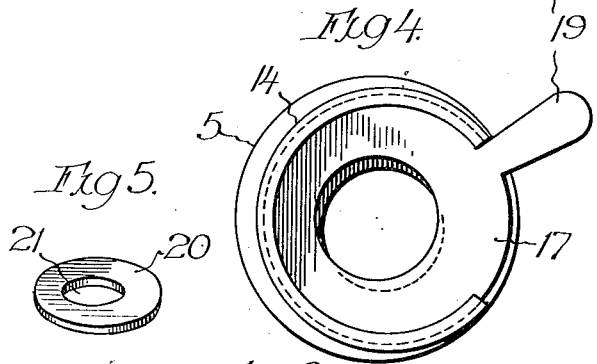
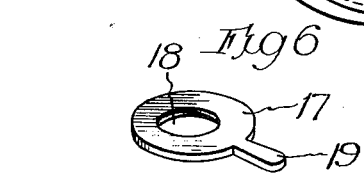
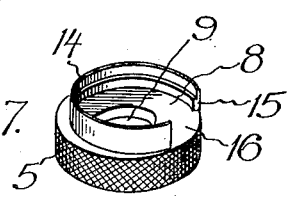
Witnesses
E. R. Barrett
A. M. Dorr.
Inventor
David Allan Cook
By Barthel & Barthel
Attorneys

UNITED STATES PATENT OFFICE.

DAVID ALLAN COOK, OF DETROIT, MICHIGAN, ASSIGNOR TO BRADLEY W. BELL, OF DETROIT, MICHIGAN.

COUPLING.

1,125,067. Specification of Letters Patent. Patented Jan. 19, 1915.

Application filed January 9, 1914. Serial No. 811,273.

*To all whom it may concern:*

Be it known that I, DAVID ALLAN COOK, a citizen of the United States of America, residing at Detroit, in the county of Wayne and State of Michigan, have invented certain new and useful Improvements in Couplings, of which the following is a specification, reference being had therein to the accompanying drawings.

To obviate the necessity of using screw threads for connecting an air supply pipe to the inlet tube of a pneumatic tire or other structure, I have devised a coupling, wherein positive and reliable means are employed, as hereinafter set forth, for expeditiously locking a coupling upon the air inlet tube of a tire, whereby the coupling can not become accidentally displaced as air is forced into the tube and the tire thereof.

I attain the above and other objects by a simple, durable and inexpensive mechanical construction embodying an eccentric lock, which together with its appurtenant parts will be hereinafter specifically described and then claimed, and reference will now be had to the drawing, wherein—

Figure 1 is a perspective view of the coupling as applied to the air inlet tube or pipe of a pneumatic tire; Fig. 2 is a longitudinal sectional view of the coupling; Fig. 3 is an end view of the same showing the eccentric lock in an unlocked position; Fig. 4 is a similar view showing the eccentric lock in a locked position; Fig. 5 is a perspective view of a detached washer; Fig. 6 is a similar view of a detached eccentric member, and Fig. 7 is a perspective view of the lock body.

A coupling in accordance with this invention comprises a hollow dome-shaped coupling member 1 having a tubular nipple 2 in communication therewith and connected to said nipple in the ordinary and well known manner is the end of an air supply pipe 3. The pipe 3 is of the conventional form that generally extends from a pump or other source of air supply for admitting air to the member 1 and an air inlet tube 4 over which the member 1 is placed. The tube 4 is also of the ordinary and well known type generally carried by a pneumatic tire or tube whereby the tire or tube can be inflated.

To couple the member 1 to the tube or pipe 4, I use a cup-shaped lock body 5 that has the outer walls thereof knurled or roughened and the inner walls screw threaded, as at 6 whereby the lock body can be screwed upon the exteriorly screw threaded flange 7 of the member 1. The lock body 5 has the bottom 8 thereof provided with a concentric opening 9 and arranged in the cup shaped body 5. Upon the bottom 8 thereof is a washer 10 and a resilient gasket 11. The gasket 11 engages the end of the flange 7 and said gasket has an annular rib 12 engaging the inner wall of said flange. The gasket 11 also has a central nipple 13 adapted to snugly fit over the reduced end of the tube 4 and establish a non-leakable connection between the member 1 and said tube.

The bottom 8 of the lock body 5 has a depending annular cage 14 that is eccentrically disposed relatively to the opening 9 of the lock body. The cage 14 is made of malleable metal and the inner wall thereof is chamfered or cut away to provide an annular seat 15. The wall of the cage 14 is also cut away where said cage meets the peripheral edge of the body 5 to provide an opening 16 for the purpose that will hereinafter appear.

Loosely mounted upon the bottom 8 of the lock body 5, within the cage 14, is a flat locking member 17 in the form of a disk, said member having an eccentric opening 18 adapted in one position of the member to register with the opening 9 in the bottom of the lock body. The member 17 has a radially disposed handle or extension 19 that extends through the opening 16 of the cage and permits of the locking member being shifted in the cage.

Arranged upon the seat 15 of the cage is a washer 20 provided with an eccentric opening 21 normally in alinement with the opening 9 in the bottom of the lock body. The washer 20 retains the locking member 17 in the cage and said washer is retained upon the seat 15 by bending the edges of the cage 14 into engagement therewith, as best shown in Fig. 2 of the drawing. With the cage 14 made of malleable metal the edges thereof can be easily up-set or flanged to prevent the washer 20 and the locking member 17 from becoming accidentally displaced.

The walls of the opening 18 of the locking member 17 are screw threaded, as shown in Fig. 2 or otherwise formed whereby a wall of the opening 18 can be shifted into engagement with the wall of the air inlet tube 4 to secure the lock body 5 against accidental displacement by internal air pressure as the tube 4 is being supplied with air.

With the handle or extension 19 engaging one end of the cage the locking member 17 is in an unlocked position and with the handle or extension 19 engaging the other end of the cage the locking member is in a locked position. This is best shown in Figs. 3 and 4 of the drawing.

From the foregoing it will be observed that the coupling can be easily and quickly fitted over the end of the air inlet tube 4 and then the locking member 17 actuated to secure the coupling against accidental displacement relatively to the tube 4. The eccentric locking member 17 affords ready means for connecting the coupling without injuring the screw threads of the air inlet tube 4 and without the necessity of using a wrench or tools.

One embodiment of my invention has been illustrated, but it is to be understood that the structural elements are susceptible to such variations and modifications as fall within the scope of the appended claims.

What I claim is:—

1. In a coupling, the combination with an exteriorly screw threaded air inlet tube, and a coupling member adapted to supply air thereto, of a lock body detachably connected to said member and provided with an opening to receive the end of said tube, a gasket within said lock body for snugly engaging said tube, a cage carried by said lock body and having the wall thereof cut away to provide stops, a washer arranged in said cage, an eccentric locking member rotatably supported within said cage between said lock body and said washer and adapted to engage the threads of said tube and lock said body relative thereto, and a handle carried by said member to facilitate shifting said member, said handle being limited in its movement by the stops of said cage.

2. In a coupling, the combination with an exteriorly screw threaded air inlet tube, and a coupling member adapted to supply air thereto, of a lock body detachably connected to said member and provided with an opening to receive the end of said tube, an eccentric depending cage carried by said lock body and having the wall thereof cut away to provide stops, a washer arranged in said cage, an in-turned flange carried by said cage and supporting said washer therein, an eccentric locking member rotatably supported within said cage between said lock body and said washer and adapted to engage the threads of said tube and lock said body relative thereto, and a handle carried by said member to facilitate shifting said member within said cage, said handle being limited in its movement by contacting with the stops of said cage.

In testimony whereof I affix my signature in presence of two witnesses.

DAVID ALLAN COOK.

Witnesses:
ANNA M. DORR,
G. E. McGRANN.